United States Patent
Kelly et al.

(10) Patent No.: US 9,758,165 B2
(45) Date of Patent: Sep. 12, 2017

(54) VEHICLE SPEED CONTROL SYSTEM AND METHOD

(71) Applicant: Jaguar Land Rover Limited, Whitley Coventry Warwickshire (GB)

(72) Inventors: James Kelly, Solihull (GB); Andrew Fairgrieve, Rugby (GB); Daniel Woolliscroft, Alvechurch (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/776,820

(22) PCT Filed: Jan. 27, 2014

(86) PCT No.: PCT/EP2014/051507
§ 371 (c)(1),
(2) Date: Sep. 15, 2015

(87) PCT Pub. No.: WO2014/139717
PCT Pub. Date: Sep. 18, 2014

(65) Prior Publication Data
US 2016/0023658 A1 Jan. 28, 2016

(30) Foreign Application Priority Data
Mar. 15, 2013 (GB) .................. 1304781.6

(51) Int. Cl.
*B60W 30/14* (2006.01)
*B60W 50/08* (2012.01)

(52) U.S. Cl.
CPC ........ *B60W 30/143* (2013.01); *B60W 50/085* (2013.01); *B60K 2310/20* (2013.01); *B60K 2310/244* (2013.01); *B60K 2350/928* (2013.01); *B60W 2520/10* (2013.01); *B60Y 2200/20* (2013.01)

(58) Field of Classification Search
CPC ...... B60W 30/143; B60W 2550/14–2550/148; B60W 40/06; B60W 50/00;
(Continued)

(56) References Cited

U.S. PATENT DOCUMENTS 6,266,604 B1 * 7/2001 Linden .................. B60K 31/04
180/197
6,374,173 B1 * 4/2002 Ehlbeck ............... B60K 31/047
180/170
(Continued)

FOREIGN PATENT DOCUMENTS

| GB | 2350700 A | 12/2000 |
| GB | 2499657 A | 8/2013 |
| JP | 2008302928 A | 12/2008 |

OTHER PUBLICATIONS

International Search Report for application No. PCT/EP2014/051507 dated Jun. 12, 2014, 7 pages.
(Continued)

*Primary Examiner* — Genna Mott
(74) *Attorney, Agent, or Firm* — Reising Ethington P.C.

(57) ABSTRACT

A system for controlling the speed of a vehicle, the system being operable to cause the vehicle to operate in accordance with a value of vehicle set-speed, the system being operable to allow a user to change the current value of vehicle set-speed in discrete steps by means of user input means, a magnitude of the discrete steps being determined by the system in dependence on a vehicle operational state.

18 Claims, 8 Drawing Sheets

(58) Field of Classification Search
CPC .... B60W 2720/10–2720/106; B60W 2720/28; B60W 50/085; B60W 2350/928; B60W 2520/10; B60K 2310/20; B60K 2350/928; B60K 2310/244; B60Y 2200/20
USPC ..................................................... 701/50, 93
See application file for complete search history.

(56) References Cited

U.S. PATENT DOCUMENTS

| | | |
|---|---|---|
| 2003/0010152 A1 | 1/2003 | Evans et al. |
| 2003/0200016 A1* | 10/2003 | Spillane ............. B60G 17/0195 701/36 |
| 2004/0088098 A1 | 5/2004 | Muehlbauer et al. |
| 2005/0004732 A1 | 1/2005 | Berry et al. |
| 2005/0114009 A1 | 5/2005 | Hellmann et al. |
| 2009/0240398 A1* | 9/2009 | Nanami ................ B60W 40/04 701/41 |
| 2014/0200788 A1* | 7/2014 | Eriksson ............ B60K 31/0058 701/93 |

OTHER PUBLICATIONS

GB Combined Search and Examination Report for corresponding application No. GB1304781.6, dated Sep. 12, 2013, 5 pages.
GB Combined Search and Examination Report for corresponding application No. GB1401333.8, dated Aug. 18, 2014, 5 pages.
Written Opinion for application No. PCT/EP2014/051507 dated Jun. 12, 2014, 8 pages.

* cited by examiner

VEHICLE SPEED CONTROL SYSTEM AND METHOD

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

The content of co-pending UK patent application no GB2507622 is hereby incorporated by reference.

BACKGROUND TO THE INVENTION

In known vehicle speed control systems, typically referred to as cruise control systems, the vehicle speed is maintained on-road once set by the user without further intervention by the user so as to improve the driving experience for the user by reducing workload.

The user selects a speed at which the vehicle is to be maintained, and the vehicle is maintained at that speed for as long as the user does not apply a brake or, in some systems, the clutch. The cruise control system takes its speed signal from the driveshaft or wheel speed sensors. When the brake or the clutch is depressed, the cruise control system is disabled so that the user can override the cruise control system to change the vehicle speed without resistance from the system. If the user depresses the accelerator pedal the vehicle speed will increase, but once the user removes his foot from the accelerator pedal the vehicle reverts to the pre-set cruise speed.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Such systems are usually operable only above a certain speed, typically around 30 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

It is also known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as special programs off (SPO). The vehicle mode controller may be referred to as a Terrain Response (TR)® System or controller. The driving modes may also be referred to as terrain modes, terrain response modes, or control modes.

It is desirable to provide a speed control system capable of controlling vehicle speed at relatively low speeds and whilst driving in off road conditions.

STATEMENTS OF INVENTION

Embodiments of the invention may be understood with reference to the appended claims.

Aspects of the present invention provide a system, a vehicle and a method.

In one aspect of the invention for which protection is sought there is provided a system for controlling the speed of a vehicle, the system being operable to cause the vehicle to operate in accordance with a value of vehicle set-speed, the system being operable to allow a user to change the current value of vehicle set-speed in discrete steps by means of user input means, a magnitude of the discrete steps being determined by the system in dependence on a vehicle operational state.

Embodiments of the present invention have the advantage that the magnitude of the discrete steps can be set to values that are appropriate to a given operational state, such as vehicle speed, selected operating mode (such as terrain mode) or other operational state. It is to be understood that the magnitude of a discrete step change in vehicle speed when a vehicle is operating in one operational state, such as at one speed, may be inappropriate when the vehicle is operating in a different operational state, such as at a different speed. If the magnitude of the discrete step is too high, a user may perceive the vehicle to be lacking composure. In contrast, if the magnitude of the discrete step is too low, the user may become frustrated or distracted.

The system may be configured to receive information indicative of the terrain over which a vehicle is driving and be operable to determine the magnitude of the discrete steps in dependence at least in part on the information indicative of the terrain over which a vehicle is driving. The system may be configured to receive information indicative of a terrain over which a vehicle is driving by receiving a signal indicative of the identity of a terrain operating mode in which a vehicle is operating. The system may be configured to determine from signals indicative of the terrain over which a vehicle is driving, which of a plurality of terrain operating modes a vehicle should operate in the system being operable to determine the magnitude of the discrete steps in dependence at least in part on the determined operating mode.

In one arrangement determining the magnitude of the discrete steps in dependence at least in part on the information indicative of the terrain over which a vehicle is driving may comprise determining the magnitude of the discrete steps in dependence at least in part on a state of a manual terrain operating mode selector dial, such as a terrain response (TR) mode.

Alternatively the system may be operable to determine the magnitude of the discrete steps in dependence at least in part on one or more parameters indicative of terrain type. In this arrangement determining the magnitude of the discrete steps in dependence at least in part on the information indicative of the terrain over which a vehicle is driving may comprise determining which of the plurality of terrain operating modes has been selected automatically by automatic operating a mode selection means.

The magnitude of the discrete steps in a first one or more terrain operating modes is greater than the magnitude of the discrete steps in a second one or more terrain operating modes. The first one or more terrain operating modes may include one or more of a sand mode of operation and a standard on-road mode of operation. The second one or more terrain operating modes may include one or more of a grass/gravel/snow mode of operation; and a mud and ruts mode of operation. The second one or more terrain operating modes may include a rock crawl mode of operation. The magnitude of the discrete steps in the rock crawl mode of operation may be smaller than those in the grass/gravel/snow mode of operation or the mud and ruts mode of operation The vehicle operational state may be characterised at least in part by a vehicle speed, the system being configured to determine the magnitude of the discrete steps in dependence at least in part on vehicle speed.

The system may be operable to increase the magnitude of the discrete steps as a function of increasing vehicle speed.

This feature has the advantage that a driver may be provided with a wider choice of set speeds at relatively low speeds, whilst at the same time enabling the driver to change the set-speed from a relatively low value to a relatively high value with a lower number of increments than might otherwise be required.

The system may be operable to increase the magnitude of the discrete steps as a function of increasing vehicle speed at each of one or more prescribed speeds.

Optionally, consecutive prescribed speeds may differ from one another by more than two discrete steps. Thus, a change in discrete step size requires adjustment of speed by more than one discrete step size. That is, in order to change vehicle set-speed from one of the prescribed speeds to another consecutive prescribed speed, a user would be required to request more than one increment (or decrement) in set-speed.

The system may be operable wherein the magnitude of the discrete steps is determined in further dependence on whether set-speed is being increased or decreased.

In a further aspect of the invention for which protection is sought there is provided a vehicle comprising a system according to a preceding aspect.

In a further aspect of the invention for which protection is sought there is provided a method of controlling a speed of a vehicle, the method comprising: causing the vehicle to operate in accordance with a value of vehicle set-speed; and allowing a user to change the current value of vehicle set-speed in discrete steps by means of user input means, a magnitude of the discrete steps being determined in dependence on a vehicle operational state.

In one aspect of the invention for which protection is sought there is provided a system for controlling the speed of a vehicle, the system being operable to cause the vehicle to operate in accordance with a value of vehicle set-speed, the system being operable to allow a user to change the current value of vehicle set-speed in discrete steps by means of user input means, a magnitude of the discrete steps being determined by the system in dependence on vehicle speed.

In another aspect of the invention for which protection is sought there is provided a method of controlling a speed of a vehicle, the method comprising: causing the vehicle to operate in accordance with a value of vehicle set-speed: and allowing a user to change the current value of vehicle set-speed in discrete steps by means of user input means, a magnitude of the discrete steps being determined in dependence on vehicle speed.

The method may further comprise: receiving information indicative of the terrain over which a vehicle is driving, and wherein the magnitude of the discrete steps is determined in dependence at least in part on the received information. Receiving information indicative of a terrain over which a vehicle is driving may comprise receiving a signal indicative of the identity of a terrain operating mode in which a vehicle is operating.

The method may further comprise determining from signals indicative of the terrain over which a vehicle is driving, which of a plurality of terrain operating modes a vehicle should operate in, and determining the magnitude of the discrete steps in dependence at least in part on the determined operating mode. The method may further comprise determining the magnitude of the discrete steps in dependence at least in part on a state of a manual terrain operating mode selector dial.

Determining the magnitude of the discrete steps may be in dependence at least in part on one or more parameters indicative of terrain type, for example by determining which of the plurality of terrain operating modes has been selected automatically by automatic operating a mode selection means.

The magnitude of the discrete steps in a first one or more terrain operating modes may be greater than the magnitude of the discrete steps in a second one or more terrain operating modes. The first one or more terrain operating modes may include one or more of: a sand mode of operation; and a standard on-road mode of operation. The second one or more terrain operating modes may include one or more of: a grass/gravel/snow mode of operation; and a mud and ruts mode of operation. The second one or more terrain operating modes may include a rock crawl mode of operation.

In one arrangement the vehicle operational state may be further characterised at least in part by a vehicle speed, the method further comprising determining the magnitude of the discrete steps in dependence at least in part on vehicle speed. The magnitude of the discrete steps may be increased as a function of increasing vehicle speed.

The method may further comprise increasing the magnitude of the discrete steps as a function of increasing vehicle speed at each of one or more prescribed speeds. Consecutive prescribed speeds may differ from one another by more than two discrete steps.

The method may comprise determining the magnitude of the discrete steps in further dependence on whether set-speed is being increased or decreased.

According to a further aspect of the invention, for which protection is sought, there is provided a computer program product executable on a processor so as to implement the method described in the preceding paragraphs.

According to a further aspect of the invention, for which protection is sought, there is provided a computer readable medium loaded with the computer program product described above.

According to a further aspect of the invention, for which protection is sought, there is provided an electronic controller arranged to implement the method described in the preceding paragraphs.

The electronic controller described herein can comprise a control unit or computational device having one or more electronic processors. The controller may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device.

In one aspect of the invention for which protection is sought there is provided a system for controlling the speed of a vehicle, the system being operable to cause the vehicle to operate in accordance with a value of vehicle set-speed, the system being operable to allow a user to change the current value of vehicle set-speed in discrete steps by means of user input means, a magnitude of the discrete steps being determined by the system in dependence on a currently selected vehicle driving mode.

In another aspect of the invention for which protection is sought there is provided a method of controlling a speed of a vehicle, the method comprising: causing the vehicle to operate in accordance with a value of vehicle set-speed; and allowing a user to change the current value of vehicle set-speed in discrete steps by means of user input means, a magnitude of the discrete steps being determined in dependence on a currently selected vehicle driving mode.

It is to be understood that the set-speed may also be referred to herein as a 'target speed' and the terms 'target speed' and 'set-speed' are used interchangeably herein.

It will be appreciated that preferred and/or optional features of any one aspect of the invention may be incorporated alone or in appropriate combination within the any other aspect of the invention also.

BRIEF DESCRIPTION OF THE DRAWINGS

The invention will now be described by way of example only with reference to the following figures in which.

DETAILED DESCRIPTION

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function block is made for ease of explanation of the manner of operation of the controller.

Figure 1:
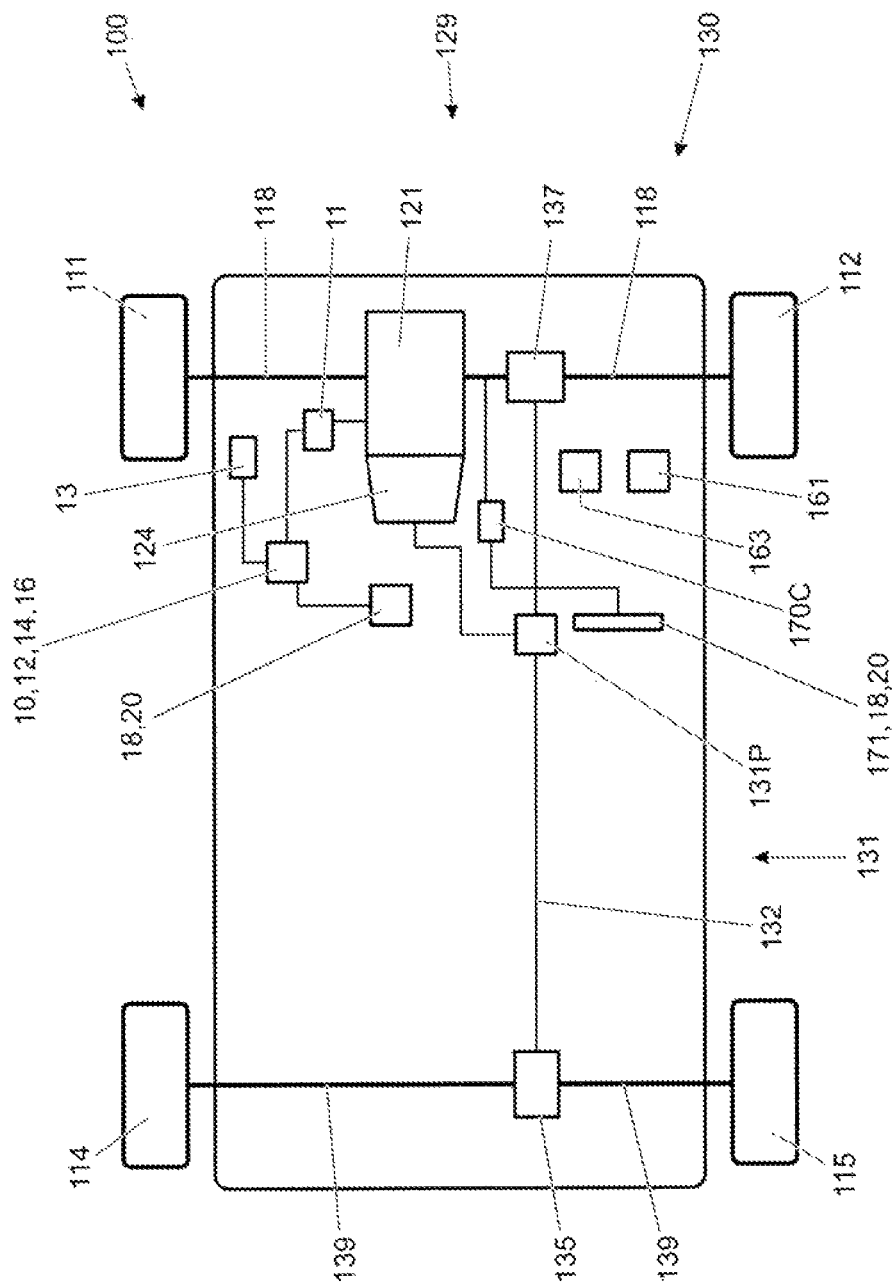
FIG. 1 is a schematic illustration of a vehicle according to an embodiment of the invention in plan view.
Figure 2:
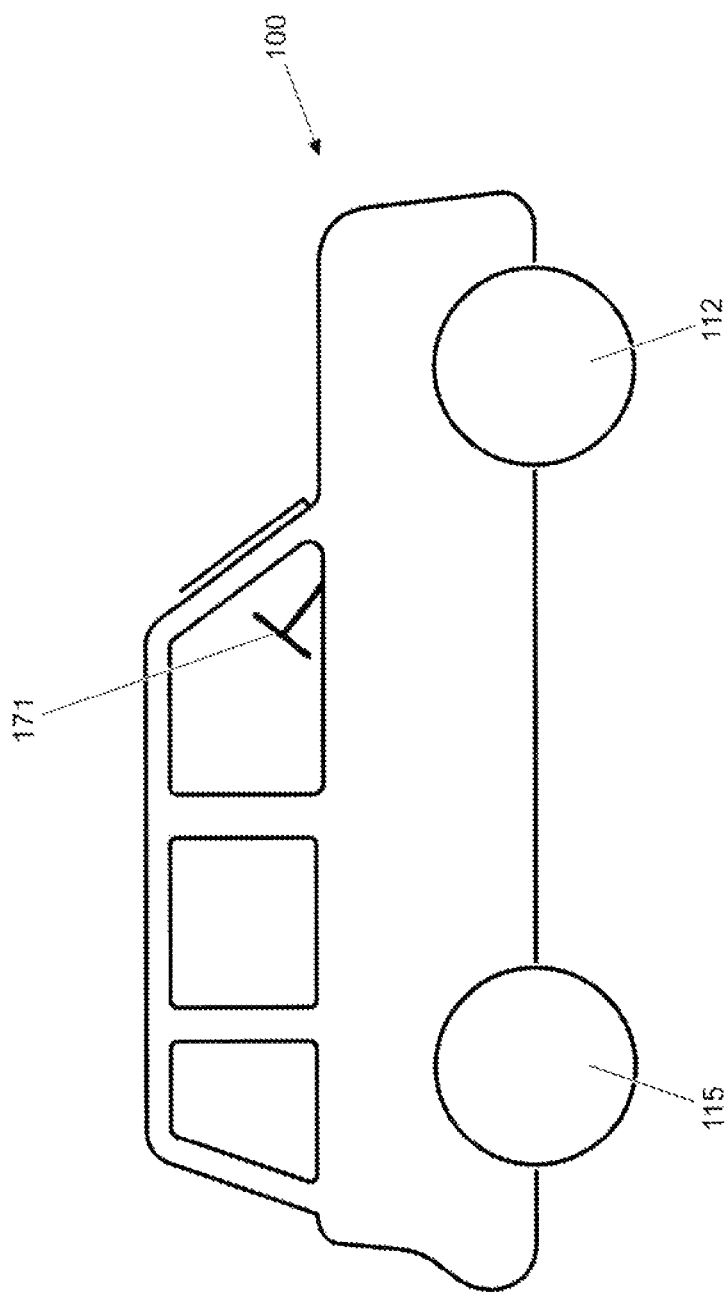
FIG. 2 shows the vehicle of FIG. 1 in side view.

FIG. 1 shows a vehicle 100 according to an embodiment of the invention having a powertrain 129. The powertrain 129 includes an engine 121 that is connected to a driveline 130 having an automatic transmission 124. Embodiments of the present invention are suitable for use in vehicles with manual transmissions, continuously variable transmissions or any other suitable transmission.

The driveline 130 is arranged to drive a pair of front vehicle wheels 111, 112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
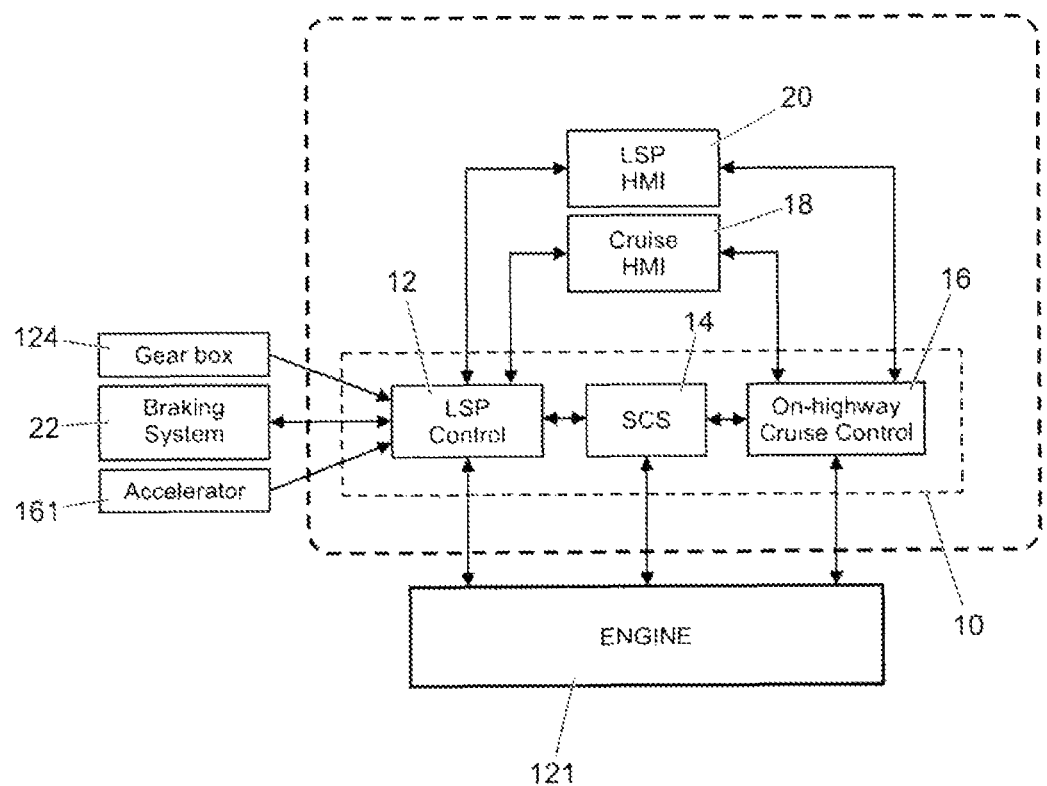
FIG. 3 is a high level schematic diagram of an embodiment of the vehicle speed control system of the present invention, including a cruise control system and a low-speed progress control system.

A control system for the vehicle engine 121 includes a central controller, referred to as a vehicle control unit (VCU) 10, a powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14, the latter being a known component of existing vehicle control systems. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 6:
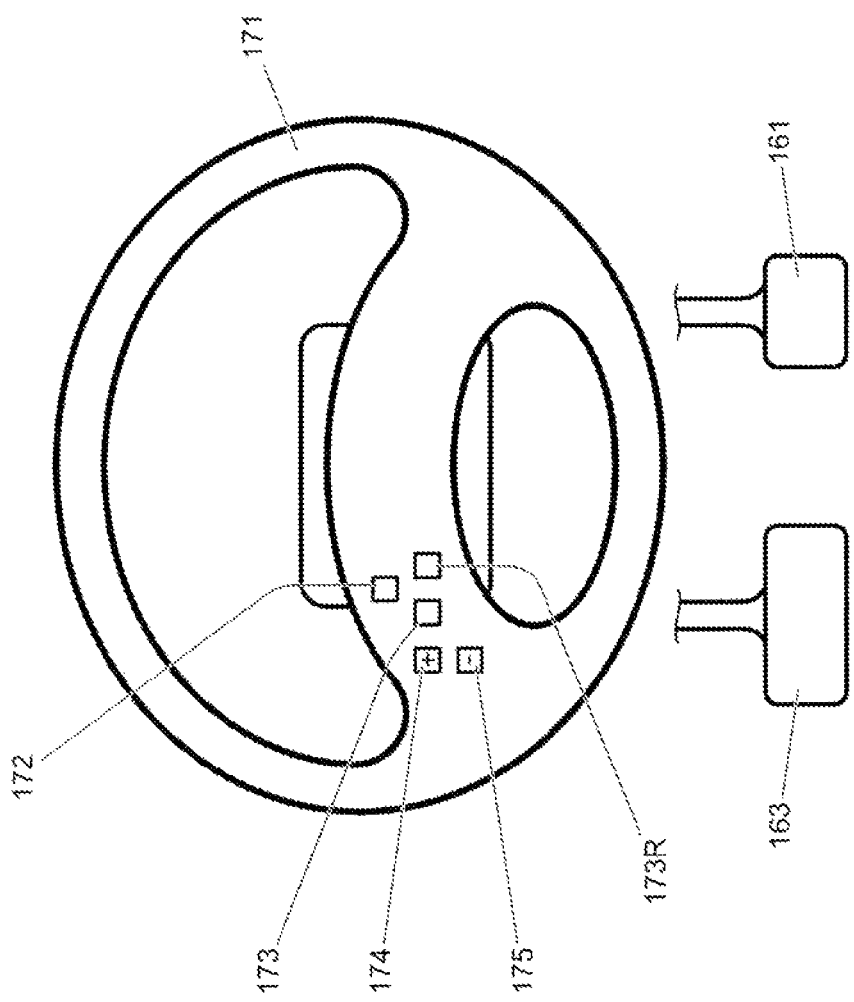
FIG. 6 illustrates a steering wheel and brake and accelerator pedals of a vehicle according to an embodiment of the present invention.

The vehicle 100 also includes a cruise control system 16 which is operable to automatically maintain vehicle speed at a selected speed when the vehicle is travelling at speeds in excess of 30 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 6). Depression of a 'set-speed' control 173 sets the set-speed to the current vehicle speed. Depression of a '+' button 174 allows the set-speed to be increased whilst depression of a '−' button 175 allows the set-speed to be decreased. In some embodiments, if the cruise control system 16 is not active when the '+' button 174 is depressed, the cruise control system 16 is activated.

The cruise control system 16 monitors vehicle speed and any deviation from the target vehicle speed is adjusted automatically so that the vehicle speed is maintained at a substantially constant value, typically in excess of 30 kph. In other words, the cruise control system is ineffective at speeds lower than 30 kph. The cruise control HMI 18 may also be configured to provide an alert to the user about the status of the cruise control system 16 via a visual display of the HMI 18.

The LSP control system 12 provides a speed-based control system for the user which enables the user to select a very low target speed at which the vehicle can progress without any pedal inputs being required by the user. This low-speed progress control function is not provided by the on-highway cruise control system 16 which operates only at speeds above 30 kph. Furthermore, known on-highway cruise control systems including the present system 16 are configured so that, in the event that the user depresses the brake or the clutch, the cruise control function is cancelled and the vehicle 100 reverts to a manual mode of operation which requires user pedal input to maintain vehicle speed. In addition, detection of a wheel slip event, as may be initiated by a loss of traction, also has the effect of cancelling the cruise control function.

The LSP control system 12 is operable to apply selective powertrain, traction control and braking actions to the wheels of the vehicle, collectively or individually, to maintain the vehicle 100 at the desired speed. It is to be understood that if the vehicle 100 is operating in a two wheel drive mode in which only front wheels 111, 112 are driven, the control system 12 may be prevented from applying drive torque to rear wheels 113, 114 of the vehicle 100.

The user inputs the desired target speed to the LSP control system 12 via a low-speed progress control HMI (LSP HMI) 20 (FIG. 1, FIG. 3). The LSP control system 12 operates at vehicle speeds typically below about 50 kph but does not activate until vehicle speed drops to below 30 kph when the cruise control system of the vehicle becomes ineffective. The LSP control system 12 is configured to operate independently of a traction event, i.e. the system 12 does not cancel speed control upon detection of wheel slip. Rather, the LSP control system 12 actively manages vehicle behaviour and in this way, at least, differs from the functionality of the cruise control system 16, as will be described in further detail below.

The LSP control HMI 20 is provided in the vehicle cabin so as to be readily accessible to the user. The user of the vehicle is able to input to the LSP control system 12, via the LSP HMI 20, an indication of the speed at which the user desires the vehicle to travel (referred to as "the target speed"). The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of a brake pedal 163. The LSP control system 12 also receives an Input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20 which is representative of the status of the LSP control function.

The cruise control HMI 18 and the LSP HMI 20 have input controls provided on a steering wheel of the vehicle for convenience of operation by the user.

FIG. 6 shows the steering wheel 171 of the vehicle 100 of FIG. 1 in more detail, together with the accelerator and brake pedals 161, 163. As noted above, the steering wheel 171 bears user operable input controls of the cruise control HMI 18 and LSP control HMI 20. As in the case of a conventional vehicle, the steering wheel 171 has a 'set-speed' control 173, actuation of which enables a user to activate the cruise control system 16 to maintain the current vehicle speed. The wheel 171 also has a 'LSP' control activation button 172 for activating the LSP control system 12 and a resume button 173R. The resume button 173R may be used to control both the 'on-highway' cruise control system 16 when driving on road, and the LSP control system 12 when driving off-road, to resume a previously set (user defined) set-speed.

If the vehicle is operating on-highway, depression of set-speed control 173 causes the cruise control system 16 to activate provided the current vehicle speed is within the operating range of the cruise control system 16. Depression of the '+' control 174 causes the cruise control system 16 to increase the set-speed whilst depression of the '−' control 175 causes the cruise control system 16 to decrease the set-speed. It will be appreciated that '+' and '−' controls may be on a single button in some arrangements, such as a rocker-type button. In some embodiments, the '+' control 174 may function as a 'set-speed' control, in which case set-speed control 173 may be eliminated.

If the vehicle is operating off-highway, depression of set-speed control 173 causes the LSP control system 12 to activate and operate as described above, provided vehicle speed is within the operating range of the LSP control system 12.

In some embodiments, the system may further comprise a 'cancel' button operable to cancel speed control by the LSP control system 12. In some embodiments, the LSP system may be in either one of an active condition or a standby condition. In the present embodiment the LSP control system 12 is also operable to assume an intermediate condition in which vehicle speed control by the LSP control system 12 is suspended but a hill descent control (HDC) system or the like may remain active if already active. Other arrangements are also useful.

With the LSP control system 12 active, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 active the '+' and '−' buttons 174, 175 are disabled. This latter feature may prevent changes in set-speed by accidental pressing of one of these buttons, for example when negotiating difficult terrain where relatively large and frequent changes in steering angle may be required. Other arrangements are also useful.

Figure 4:
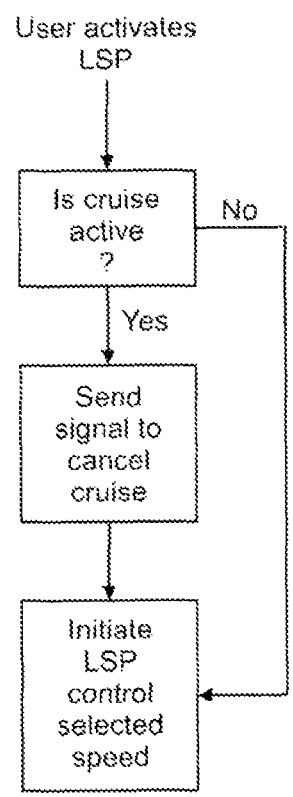
FIG. 4 is a flow diagram to illustrate the interaction between the cruise control system and the low-speed progress control system in FIG. 3.

FIG. 4 shows a flow process to illustrate the interaction between the cruise control system 18 and the LSP control system 12. If cruise control is active when the user tries to activate the LSP control system 12 via the LSP control HMI 20, a signal is sent to the cruise control system 16 to cancel the speed control routine. The LSP control system 12 is then initiated and the vehicle speed is maintained at the target speed selected by the user via the LSP HMI 20. It is also the case that if the LSP control system 12 is active, operation of the cruise control system 16 is inhibited. The two systems 12, 16 therefore operate independently of one another, so that only one can be operable at any one time, depending on the speed at which the vehicle is travelling.

In some embodiments, the cruise control system 16 may hand over vehicle speed control to the LSP control system 12 if a user reduces set-speed of the vehicle 100 to a value within the operating speed range of the LSP control system 12. Similarly, in some embodiments the LSP control system 16 may hand over vehicle speed control to the cruise control system 16 if a user raises vehicle set-speed to a value that is within the operating range of the cruise control system 16. Other arrangements are also useful.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 5:
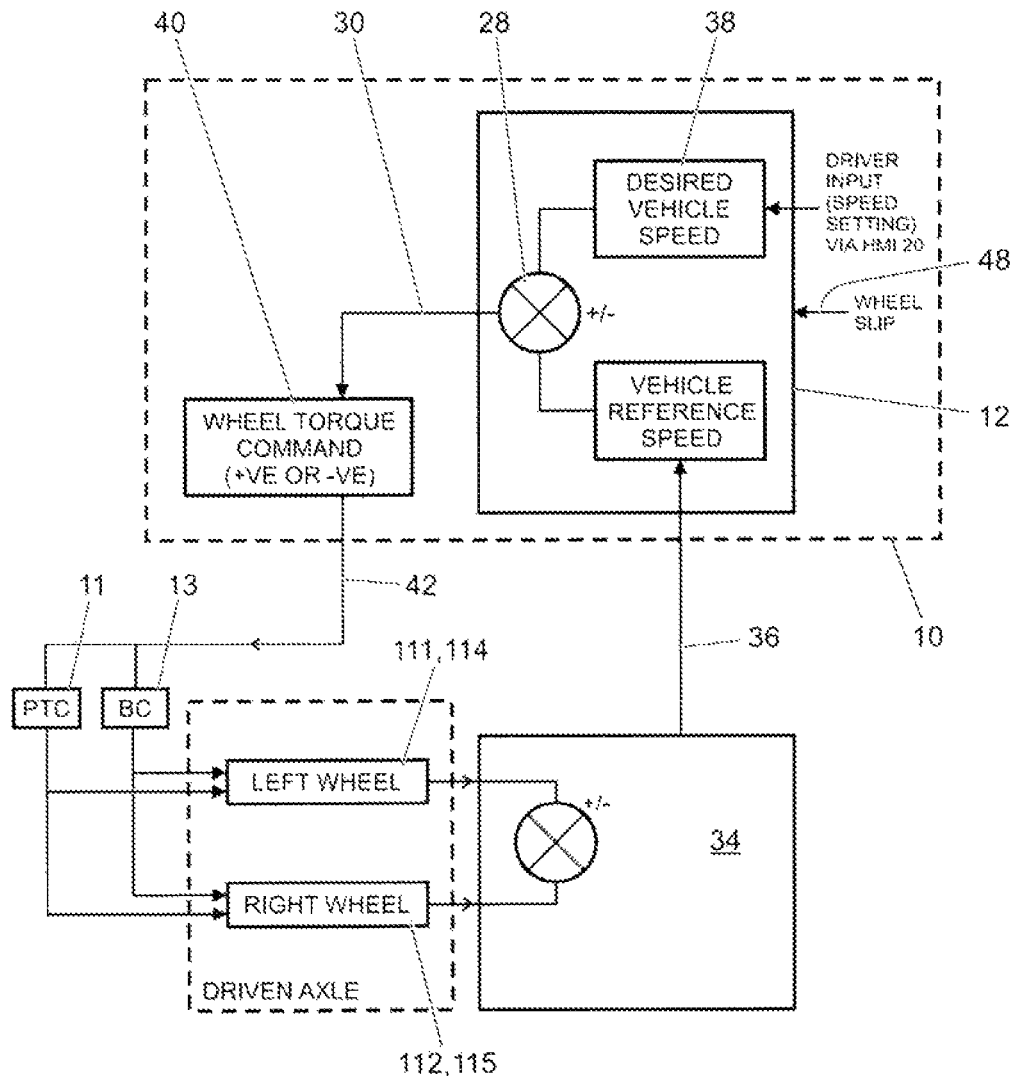
FIG. 5 is a schematic diagram of further features of the vehicle speed control system in FIG. 3.

FIG. 5 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed (also referred to as a 'target speed' 38) selected by the user with the measured speed 36 and provides an output signal indicative or the comparison. The output signal 30 is provided to an evaluator unit of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed that has been selected by the user. An increase in torque is generally accomplished by increasing the amount of powertrain torque delivered to a given position of the powertrain, for example an engine output shaft, a wheel or any other suitable location. A decrease in torque to a value that is less positive or more negative may be accomplished by decreasing powertrain torque delivered to a wheel and/or by increasing a braking force on a wheel. It is to be understood that in some embodiments in which a powertrain 129 has an electric machine operable as a generator, negative torque may be applied by the powertrain 129 to one or more wheels. It is to be understood that a brake controller 13 may nevertheless be involved in determining whether brake torque is required to be provided by an electric machine of a powertrain 129, and whether brake torque should be provided by an electric machine or a friction-based foundation braking system 22.

An output 42 from the evaluator unit 40 is provided to the powertrain controller 11 and brake controller 13 which in turn control a net torque applied to the vehicle wheels 111-115. The net torque may be increased or decreased depending on whether there is a positive or negative demand for torque from the evaluator unit 40. Thus, in order to initiate application of the necessary positive or negative torque to the wheels, the evaluator unit 40 may command that additional power is applied to the vehicle wheels and/or that a braking force is applied to the vehicle wheels, either or both of which may be used to implement the change in torque that is necessary to maintain the target vehicle speed. In the illustrated embodiment the torque is applied to the vehicle wheels individually so as to maintain the target vehicle speed, but in another embodiment torque may be applied to the wheels collectively to maintain the target speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines. In some embodiments, the one or more electric machines may be operable as either a propulsion motor or a generator under the control of the powertrain controller 11. Thus the powertrain controller 11 may in some embodiments be controlled to apply more positive or more negative torque to one or more wheels by means of an electric machine.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of the vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the desired vehicle speed as input by the user, and continues to control automatically the torque applied across the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or the cruise control function reset.

A further embodiment of the invention (not shown) is one in which the vehicle is provided with a wheel slip signal 48 derived not just from a comparison of wheel speeds, but further refined using sensor data indicative of the vehicle's speed over ground. Such speed over ground determination may be made via global positioning (GPS) data, or via a vehicle mounted radar or laser based system arranged to determine the relative movement of the vehicle and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 5, this may be implemented by providing a wheel slip event signal 48 to the LSP control system 12 which is then managed by the LSP control system 12. In the embodiment shown in FIG. 1 the SCS 14 generates the wheel slip event signal 48 and provides it to the LSP control system 12 and cruise control system 16.

A wheel slip event is triggered when a loss of traction occurs at any one of the vehicle wheels. Wheels and tyres may be more prone to losing traction when travelling on snow, ice, mud or sand and/or on steep gradients or cross-slopes, for example, or in environments where the terrain is more uneven or slippery compared with driving on a highway in normal on-road conditions. Embodiments of the present invention therefore find particular benefit when the vehicle is being driven in an off-road environment, or in conditions in which wheel slip may commonly occur. Manual operation by the user in such conditions can be a difficult and often stressful experience and may result in an uncomfortable ride. Embodiments of the present invention enable continued progress to be made at a relatively low target speed without the need for user intervention.

The vehicle 100 is also provided with additional sensors (not shown) which are representative of a variety of different parameters associated with vehicle motion and status. These may be inertial systems unique to the speed control system or part of an occupant restraint system or any other subsystem which may provide data from sensors such as gyros and/or accelerometers that may be indicative of vehicle body movement and may provide a useful input to the LSP control system 12. The signals from the sensors provide, or are used to calculate, a plurality of driving condition indicators (also referred to as terrain indicators) which are indicative of the nature of the terrain conditions over which the vehicle is travelling. The signals are provided to the VCU 10 which determines the most appropriate control mode for the various subsystems on the basis of the terrain indicators, and automatically controls the subsystems accordingly. This aspect of the invention is described in further detail in our co-pending published patent application nos. GB2492748, GB2492655 and GB2499279, the contents of each of which is incorporated herein by reference.

The sensors (not shown) on the vehicle include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the stability control system (SCS), a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes for the vehicle subsystems is appropriate, with each control mode corresponding to a particular terrain type over which the vehicle is travelling (for example, mud and ruts, sand, grass/gravel/snow). The VCU 10 then selects which of the control modes is most appropriate and controls various vehicle parameters accordingly.

The nature of the terrain over which the vehicle is travelling (as determined by reference to the selected control mode) may also be utilised in the LSP control system 12 to determine an appropriate increase or decrease in drive torque to be applied to the vehicle wheels. For example, if the user selects a target speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed (i.e. target speed), a visual indication of the speed constraint is provided to the user via the LSP HMI 20 to indicate that an alternative speed has been adopted.

It will be appreciated that as an alternative to the system automatically determining the terrain type as described above, the terrain type can be manually selected by the user and input into the system.

As described above, the LSP control system 12 is operable to allow the user to increase the current value of vehicle set-speed by means of a 'set+' button 174 (or the accelerator pedal 161) and decrease the current value of vehicle set-speed by means of a 'set −' button 175 (or brake pedal 163). The control system 12 responds to user requests to increase or decrease set-speed by means of the buttons 174, 175 or pedals 161, 163 by changing the current value of vehicle set-speed in discrete steps. The LSP control system 12 determines the value of the discrete steps in dependence on at least one of vehicle speed and terrain type.

Figure 7:
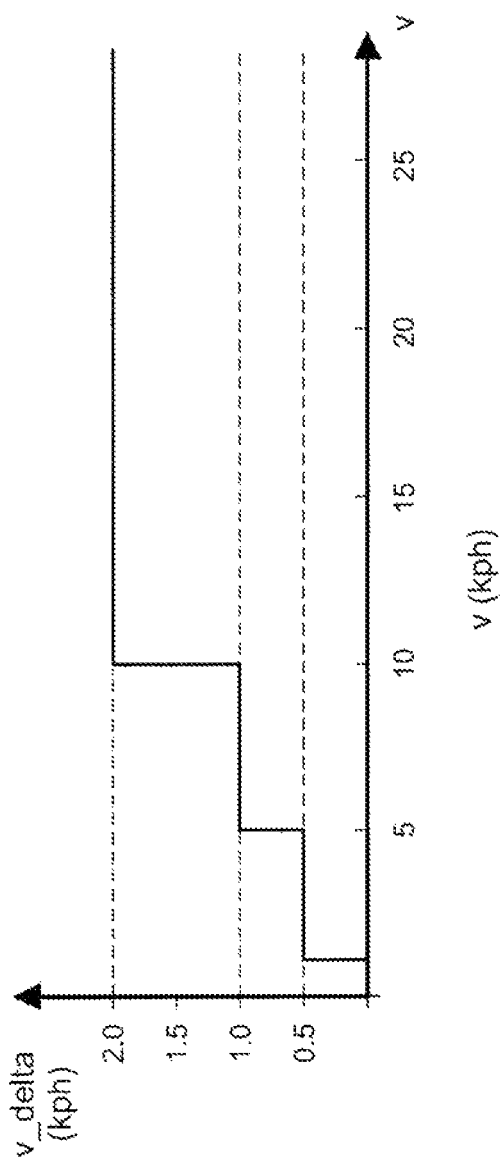
FIG. 7 is a plot of set speed increment value as a function of vehicle speed in a speed control system according to an embodiment of the present invention.

FIG. 7 is a plot showing the magnitude of the discrete steps employed, v_delta, as a function of increasing vehicle speed v.

It can be seen that for changes in values of vehicle set-speed in the speed range from 1 to 5 kph, the control system 12 is configured to increase or decrease set-speed in steps of 0.5 kph. For changes in values of vehicle set-speed in the speed range from 5 to 10 mph, the control system 12 is configured to increase or decrease set-speed in steps of 1.0 mph. For changes in values of vehicle set-speed in the speed range above 10 mph, the control system 12 is configured to increase or decrease set-speed in steps of 2.0 mph.

It is to be understood that other sizes of discrete steps over a given range of speed values are also useful. Furthermore, other values of prescribed speed above and below which the magnitude of the discrete steps change are also useful.

In some embodiments, the size of the discrete steps applied within a given range of vehicle speed may differ depending on whether set-speed is being increased or decreased.

In some embodiments, when set-speed is reduced below a speed at which a size of the discrete steps changes, the size of the discrete steps applicable to a request to decrease speed may increase rather than decrease. Alternatively, in some embodiments the size of the discrete steps applicable to a request to decrease speed may decrease by a smaller amount than the corresponding change in the size of discrete steps applied to a request for an increase in speed, when operating below a speed at which the size of discrete steps changes.

In some embodiments, if a user commands changes in set-speed more than twice in rapid succession, where successive changes are in the opposite sense, the size of the discrete steps may be changed. In one embodiment, the size of the discrete steps may be increased. Alternatively or in addition, in some embodiments the size of the discrete steps may be decreased.

A determination whether step size is increased or decreased may depend on whether a user first requests an increase in set-speed or a decrease in set-speed when commencing the succession of requests. In one embodiment, step size is increased if an increase in set-speed is initially made, whereas the step size may be decreased if a decrease in set-speed is initially made.

For example, the user may trigger a change in step size by making each successive request within a prescribed time period of the previous request, for example within 0.5 s, 1.0 s or any other suitable value. The size of the discrete steps is then changed in respect of subsequent requests for a change in set-speed. The size of the steps may be increased if an increase in set-speed followed by a decrease in step-speed is commanded twice, each request being made within the prescribed time period of the previous request. Other numbers of request may be required in order to change the discrete step size in some embodiments, such as three successive requests to increase and decrease set-speed.

In some embodiments, the speed control system may be operable to allow set-speed to be increased or decreased by a user provided the value of set-speed does not exceed a maximum value that the system 12 has determined to be appropriate to the prevailing terrain. The system 12 may ignore requests to increment set-speed above this value. In some embodiments, the system 12 may accept a request to increment set-speed above this value but not act upon the request, i.e. not attempt to accelerate the vehicle to a set-speed that is greater than the maximum value that has been determined to be appropriate.

Figure 8:
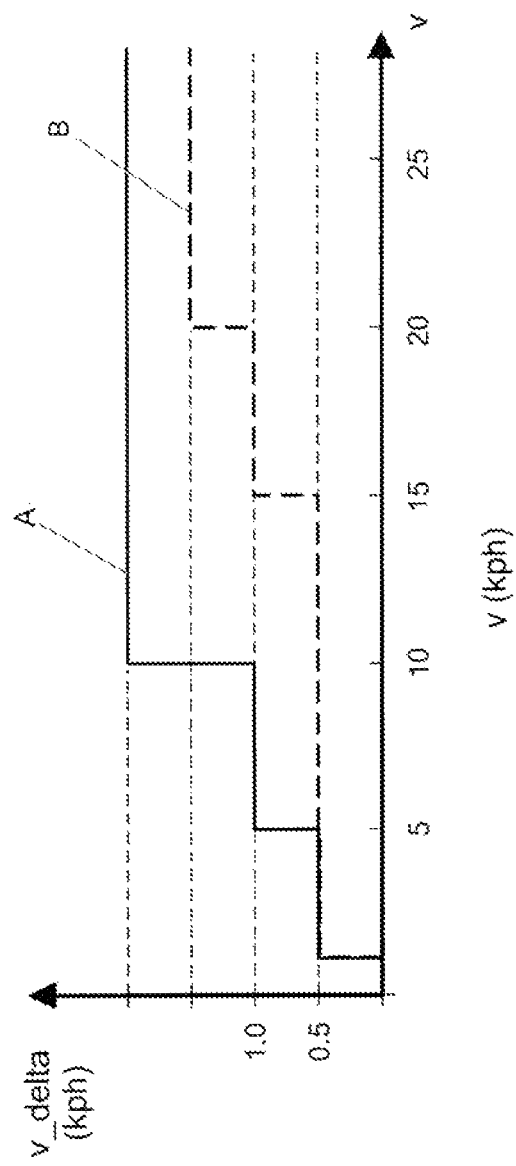
FIG. 8 is a plot of set-speed increment value as a function of vehicle speed for two different driving modes in a speed control system according to a further embodiment of the present invention.

FIG. 8 is a plot showing the magnitude of the discrete steps employed when changing set-speed in response to a user request, v_delta, as a function of increasing vehicle speed v, in different vehicle driving modes. Trace A corresponds to a driving mode adapted for operation on a relatively smooth surface having a relatively high surface coefficient of friction. Trace B corresponds to a driving mode adapted for operation on a relatively rough surface. Trace B may also be suitable for operation on a surface having a relatively low surface coefficient of friction.

It can be seen that, in the case of trace A (which corresponds to the trace shown in FIG. 7), the value of set-speed increment has a value of 0.5 kph at speeds from 1 to 5 kph. At speeds from 5 to 10 kph the increment has a value of 1.0 kph. At speeds above 10 kph, the increment has a value of 2.0 kph.

In contrast, for trace B, the discrete steps have a value of 0.5 kph over a larger speed range, from 1 kph to 15 kph. The steps have a value of 1.0 kph for speeds in the range from 15 to 20 kph, and a value of 1.5 kph for speeds above 20 kph.

It is to be understood that other values of discrete step size are also useful, and other values of vehicle speed at which a change in discrete step size is applied. In some embodiments, for one or more modes, the value of discrete step size may be substantially constant at all speeds, such as a value of 0.5 kph, 1.0 kph or any other suitable value. A value of 0.5 kph may be useful during vehicle operations on surfaces having a particularly low surface coefficient of friction, for example values of from 0 to 0.1, from 0 to 0.2, from 0 to 0.3 or any other suitable range.

In some embodiments, in the event the system determines that a change in vehicle operating mode has taken place (and/or is about to take place, in some embodiments), a suitably intuitive approach may be adopted for managing a change in set-speed discrete step size. The change in vehicle operating mode may for example be a change in a terrain response (TR) mode.

In some embodiments, if the change in TR mode indicates a transition from a driving surface having a relatively low surface coefficient of friction with a vehicle wheel to a driving surface having a relatively high surface coefficient of friction, the size of the discrete steps may increase. The converse may occur in moving from a surface having relatively high surface coefficient of friction to a surface having a relatively low surface coefficient of friction.

In some embodiments, if the change in TR mode indicates a transition from terrain of relatively low roughness to terrain of relative high roughness, the size of the discrete steps may be decreased, whilst for a transition from relatively high to relatively low terrain roughness, the size of the discrete steps may be increased. Other arrangements are also useful.

By adjusting the size of the discrete steps the speed control system may enhance vehicle composure during vehicle operations, particularly in off-road conditions. Furthermore, changing the discrete set-size in dependence on driving mode may be useful in providing the driver with an indication of the driving mode in which the vehicle is currently operating.

It is to be understood that the control system may be configured to adjust the size of the increments to smaller values when the vehicle is negotiating difficult terrain. The system may be configured in addition or instead to apply smaller increments when towing a load or when the vehicle is driving through water in a wading. Thus, whilst in some embodiments the size of the increments changes as a function of speed, the size may in addition or instead change when it is determined that the vehicle is negotiating difficult terrain, such as when wading, and/or when towing. The system may determine that the vehicle is towing in response for example to a user input, detection of a connected trailer, such as an electrical connection to a trailer, or by any other suitable means. Additionally or alternatively, the system may determine that the vehicle is wading in response for example to a manually selected user input, or by suitable automated means such as via an exterior mounted water detection sensor, or by any other suitable means.

In some modes of operating, for example in a normal on road mode of operation (often referred to as "Special programs off" (or SPO) where there is a high surface friction, or in a sand mode of operation where a relatively high rate of acceleration may be required, the magnitude of the increments can be relatively large. In for example a "rock crawl" mode of operation for driving over rocky or boulder strewn terrain to maintain vehicle composure small increments of speed change are desirable and accordingly a small increment step may be set. In other modes of operation, for example in a grass/gravel/snow mode of operation or a mud and ruts mode of operation, again small increments of speed change are required to maintain composure. In this manner by changing the increment size in dependence upon the terrain mode of operation driver workload can be reduced and vehicle composure maintained.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A system for controlling a speed of a vehicle, the system comprising a vehicle control unit, a low-speed progress control system and a cruise control system, wherein the low-speed progress control system and the cruise control system are configured differently, the system being operable to cause the vehicle to operate in accordance with a value of vehicle set-speed, the system being operable to allow a user to change a current value of vehicle set-speed in discrete steps by means of a user interface in the vehicle, a magnitude of the discrete steps being determined by the low-speed progress control system in dependence on a vehicle operational state, wherein the vehicle control unit of the system is configured to receive information indicative of the terrain over which the vehicle is driving, the low-speed progress control system being operable to determine the magnitude of the discrete steps in dependence at least in part on the information indicative of the terrain over which the vehicle is driving, wherein the magnitude of the discrete steps is different for a plurality of terrain operating modes or a plurality of terrain types including one or more off-road terrain types.

2. The system according to claim 1 configured to receive the information indicative of the terrain over which the vehicle is driving by receiving a signal indicative of an identity of a terrain operating mode in which the vehicle is operating.

3. The system according to claim 1 configured to determine from signals indicative of the terrain over which the vehicle is driving, which of the plurality of terrain operating modes the vehicle should operate in, the system being operable to determine the magnitude of the discrete steps in dependence at least in part on the determined terrain operating mode.

4. The system according to claim 1 wherein determining the magnitude of the discrete steps in dependence at least in part on the information indicative of the terrain over which the vehicle is driving comprises determining the magnitude of the discrete steps in dependence at least in part on a state of a manual terrain operating mode selector dial.

5. The system according to claim 1 wherein the system is operable to determine the magnitude of the discrete steps in dependence at least in part on one or more parameters indicative of terrain type.

6. The system according to claim 5 wherein determining the magnitude of the discrete steps in dependence at least in part on the information indicative of the terrain over which the vehicle is driving comprises determining which of the plurality of terrain operating modes has been selected automatically by an automatically operating mode selector.

7. The system according to claim 1 wherein the magnitude of the discrete steps in a first one or more terrain operating modes is greater than the magnitude of the discrete steps in a second one or more terrain operating modes.

8. The system according to claim 7 wherein the first one or more terrain operating modes includes one or more of a sand mode of operation and a standard on-road mode of operation.

9. The system according to claim 7 wherein the second one or more terrain operating modes includes one or more of a grass/gravel/snow mode of operation which is intended for use on grass, gravel, and/or snow and a mud and ruts mode of operation.

10. The system according to claim 7 wherein the second one or more terrain operating modes includes a rock crawl mode of operation.

11. The system according to claim 1 wherein the vehicle operational state is further characterised at least in part by a vehicle speed, the system being configured to determine the magnitude of the discrete steps in dependence at least in part on vehicle speed.

12. The system according to claim 11 operable to increase the magnitude of the discrete steps as a function of increasing vehicle speed.

13. The system according to claim 11 operable to increase the magnitude of the discrete steps as a function of increasing vehicle speed at each of one or more prescribed speeds.

14. The system according to claim 13 wherein consecutive prescribed speeds differ from one another by more than two discrete steps.

15. The system according to claim 1 wherein the magnitude of the discrete steps is determined in further dependence on whether set-speed is being increased or decreased.

16. The vehicle comprising the system according to claim 1.

17. A method of controlling a speed of a vehicle, the vehicle comprising a vehicle control unit, low-speed progress control system, and a cruise control system, wherein the low-speed progress control system and the cruise control system are configured differently, the method comprising:
- causing the vehicle to operate in accordance with a value of vehicle set-speed;
- allowing a user to change a current value of vehicle set-speed in discrete steps by means of a user input device in the vehicle;
- determining a magnitude of the discrete steps with the low-speed progress control system in dependence on a vehicle operational state;
- receiving information at the vehicle control unit indicative of the terrain over which the vehicle is driving, and
- wherein the magnitude of the discrete steps is determined by the low-speed progress control system in dependence at least in part on the received information, wherein the magnitude of the discrete steps is different for a plurality of terrain operating modes or a plurality of terrain types including one or more off-road terrain types.

18. A non transient computer readable medium loaded with a computer program product executable on a processor in the vehicle so as to implement the method of claim 17.

\* \* \* \* \*